United States Patent [19]

Fischer et al.

[11] Patent Number: 5,496,397
[45] Date of Patent: Mar. 5, 1996

[54] DESICCANT-COATED SUBSTRATE AND METHOD OF MANUFACTURE

[75] Inventors: John C. Fischer, Marietta, Ga.; Kirk T. Mescher, Columbia, Mo.

[73] Assignee: Semco Incorporated, Columbia, Mo.

[21] Appl. No.: 350,653

[22] Filed: Dec. 7, 1994

Related U.S. Application Data

[62] Division of Ser. No. 1,561, Jan. 6, 1993, Pat. No. 5,401,706.
[51] Int. Cl.$^6$ .............................. B01D 53/04; B01J 20/10
[52] U.S. Cl. ................................ 96/154; 95/90; 502/401; 502/405; 502/407
[58] Field of Search ..................................... 502/401, 405, 502/407; 96/125, 150, 154; 95/117, 90

[56] References Cited

U.S. PATENT DOCUMENTS

| | | |
|---|---|---|
| Re. 29,932 | 3/1979 | Norback . |
| 2,462,798 | 2/1949 | Wilson . |
| 2,499,680 | 3/1950 | Plank . |
| 2,723,837 | 11/1955 | Pennington . |
| 2,892,981 | 4/1958 | Shapiro . |
| 2,926,502 | 3/1960 | Munters et al. . |
| 3,009,540 | 11/1961 | Munters . |
| 3,009,684 | 11/1961 | Munters . |
| 3,024,867 | 3/1962 | Milton . |
| 3,024,868 | 3/1962 | Milton . |
| 3,125,157 | 3/1964 | Munters et al. . |
| 3,266,973 | 8/1966 | Crowley . |
| 3,338,034 | 8/1967 | Hemstreet . |
| 3,528,224 | 9/1970 | Warn . |
| 3,666,007 | 5/1972 | Yoshino et al. . |
| 3,844,737 | 10/1974 | Macriss et al. . |
| 3,889,742 | 6/1975 | Rush et al. . |
| 3,944,658 | 3/1976 | Yoldas ..................................... 502/415 |
| 4,012,206 | 3/1977 | Macriss et al. . |
| 4,014,380 | 3/1977 | Rush et al. . |
| 4,021,590 | 5/1977 | Vangbo . |
| 4,025,668 | 5/1977 | Norbäck . |
| 4,036,360 | 7/1977 | Deffeyes . |
| 4,040,804 | 8/1977 | Harrison . |
| 4,061,835 | 12/1977 | Poppe et al. . |
| 4,081,024 | 3/1978 | Rush et al. . |
| 4,093,435 | 6/1978 | Marron et al. . |
| 4,109,431 | 8/1978 | Mazzoni et al. . |
| 4,113,004 | 9/1978 | Rush et al. . |

(List continued on next page.)

FOREIGN PATENT DOCUMENTS

| | | |
|---|---|---|
| 0030863 | 6/1981 | European Pat. Off. . |
| 133855 | 1/1979 | German Dem. Rep. . |
| 52-83907 | 2/1979 | Japan . |
| 53-36359 | 11/1980 | Japan . |

OTHER PUBLICATIONS

Webster's II New Riverside University Dictionary (1994).
"Exclu–Sieve™—Total Energy Recovery Systems—The Semco Air System," SEMCO Mfg., Inc., 8 pages (1991).
"Exclu–Sieve™—Heat Wheel Retrofit Program—The Semco Air System," SEMCO Mfg., Inc., 6 pages (1991).
"Exclu–Sieve™—Design and Selection Manual—The Semco Air System," SEMCO Mfg., Inc., 11 pages (1991).
"Exclu–Sieve™—Packaged Energy Recovery Systems—The Semco Air System," SEMCO Mfg., Inc., 33 pages (1991).
"SEMCO Exclu–Sieve™—Technical Bulletin 509," SEMCO Mfg., Inc., 2 pages (1991).
"SEMCO Exclu–Sieve™—Application Bulletin 508," SEMCO Mfg., Inc., 2 pages (1991).
"SEMCO Exclu–Sieve™—Application Case History Bulletin 507," SEMCO Mfg., Inc., 2 pages (1991).
"SEMCO Exclu–Sieve™—Application Case History Bulletin 506," SEMCO Mfg., Inc., 2 pages (1991).
"Air exchanger eliminates cross contamination in animal lab." reprint from *Consulting–Specifying Engineer*, 1 page (Jan. 1990).
"IA Q and Office Buildings: An Exclu–Sieve™ Solution," *ASHRAE Journal's Supplier Capabilities Supplement*, pp. S–44 and S–45 (Aug. 1990).
"Exclu–Sieve™ Design Solutions: Animal and Chemical Research Laboratories," Bulletin 504, Issue 1, SEMCO Mfg., Inc., 4 pages (Jul. 1989).
*The Dehumidification Handbook*, published by Cargocaire Engineering Corporation, 103 pages (copyright 1982, fourth printing Nov. 1984).
C. Bayer et al., "Results of Chemical Cross–contamination Testing of a Total Energy Recovery Wheel—Phase I," Georgia Institute of Technology, 8 pages (Jun. 5, 1991).
*ASHRAE™ Standard 62–1989—Ventilation for Acceptable Indoor Air Quality*, American Society of Heating, Refrigerating and Air–Conditioning Engineers, Inc., pp. 1, 6–12, 15, 23, 24 (1989).
C. Downing, "Tech Brief #15—Desiccant Air–Conditioning," Industrial Energy Extension Service of Georgia Tech, 4 pages (1989).
*Hawley's Condensed Chemical Dictionary*, entry for "molecular sieve," pp. 792–793 (11th edition 1987).
"Material Safety Data Sheet" for Polyurethane Aqueous Dispersion #42823, Roymal, Inc. (Mar. 16, 1990).

*Primary Examiner*—Anthony McFarlane
*Attorney, Agent, or Firm*—Bryan Cave

[57] ABSTRACT

Desiccant-coated substrates, regeneratable rotary dehumidification wheels and other devices for gas (e.g., air) treatment using those substrates, and processes for making them are disclosed. The substrates may have coatings in thicknesses of from about 2 to about 10 mils containing particles of one or more adsorbent desiccants and an organic water-based binder. The desiccant particles retain a high fraction of their original adsorption capacity because the pores of the desiccant particles contain a pore-clearing agent prior to the binder setting and the pore-clearing agent leaves the pores during the manufacturing process to prevent the binder from blocking the pores. In preferred embodiments a mixture of different desiccants is used and a particle suspending agent keeps the particles well-mixed so that the desiccant particles in the coated substrate will be as well-mixed as possible. The suspending agent may also function as the pore-clearing agent. A pH-adjusting agent may be used to control the pH of the coating if the binder or another constituent of the coating is pH-sensitive.

39 Claims, No Drawings

U.S. PATENT DOCUMENTS

| | | |
|---|---|---|
| 4,130,111 | 12/1978 | Ristic . |
| 4,134,743 | 1/1979 | Macriss et al. . |
| 4,140,458 | 2/1979 | Evert et al. . |
| 4,162,934 | 7/1979 | Norbäck . |
| 4,172,164 | 10/1979 | Meyer et al. . |
| 4,180,126 | 12/1979 | Rush et al. . |
| 4,222,244 | 9/1980 | Meckler . |
| 4,246,962 | 1/1981 | Norbäck . |
| 4,255,171 | 3/1981 | Dravnicks . |
| 4,290,789 | 9/1981 | Newton . |
| 4,325,220 | 4/1982 | McFarlin . |
| 4,341,539 | 7/1982 | Gidaspow et al. . |
| 4,346,051 | 8/1982 | McFarlin . |
| 4,365,979 | 12/1982 | Takeyama et al. . |
| 4,382,807 | 5/1983 | Diachuk . |
| 4,396,206 | 8/1983 | Tsuge et al. ............................... 96/136 |
| 4,402,717 | 9/1983 | Izumo et al. . |
| 4,431,456 | 2/1984 | Kulprathipania . |
| 4,432,409 | 2/1984 | Steele . |
| 4,449,992 | 5/1984 | Yamada et al. . |
| 4,460,388 | 7/1984 | Fukami et al. . |
| 4,484,938 | 11/1984 | Okamoto et al. . |
| 4,505,976 | 3/1985 | Doehnert et al. . |
| 4,527,398 | 7/1985 | Schaetzle . |
| 4,529,420 | 7/1985 | Norbäck . |
| 4,540,420 | 9/1985 | Wharton et al. . |
| 4,582,129 | 4/1986 | Yano et al. . |
| 4,594,860 | 6/1986 | Coellner et al. . |
| 4,595,403 | 6/1986 | Sago et al. . |
| 4,635,446 | 1/1987 | Meckler . |
| 4,680,248 | 7/1987 | Roach . |
| 4,723,417 | 2/1988 | Meckler . |
| 4,729,774 | 3/1988 | Cohen et al. . |
| 4,747,346 | 5/1988 | Geel . |
| 4,769,053 | 9/1988 | Fischer, Jr. . |
| 4,808,505 | 2/1989 | Ueda . |
| 4,810,609 | 3/1989 | Ueda . |
| 4,871,607 | 10/1989 | Kuma et al. . |
| 4,875,520 | 10/1989 | Steele et al. . |
| 4,886,769 | 12/1989 | Kuma et al. . |
| 4,911,775 | 3/1990 | Kuma et al. . |
| 4,919,899 | 4/1990 | Herrmann et al. . |
| 4,924,934 | 5/1990 | Steele . |
| 4,948,392 | 8/1990 | Rush . |
| 4,959,970 | 10/1990 | Meckler . |
| 5,002,116 | 3/1991 | Hoagland et al. . |
| 5,026,531 | 6/1991 | Tannous et al. . |
| 5,045,295 | 9/1991 | Tannous et al. . |
| 5,052,188 | 10/1991 | Komarmeni et al. . |
| 5,059,577 | 10/1991 | Hatton . |
| 5,120,694 | 6/1992 | Dunne et al. . |
| 5,122,403 | 6/1992 | Roginski et al. . |
| 5,125,195 | 6/1992 | Brede . |
| 5,140,450 | 8/1992 | Nikaido . |
| 5,148,374 | 9/1992 | Coellner . |
| 5,238,899 | 8/1993 | Kadowaki et al. . |
| 5,300,138 | 4/1994 | Fischer et al. . |
| 5,401,706 | 3/1995 | Fischer ..................................... 502/401 |

DESICCANT-COATED SUBSTRATE AND METHOD OF MANUFACTURE

This is a divisional of U.S. application Ser. No. 08/001,561, filed Jan. 6, 1993, now U.S. Pat. No. 5,401,706.

BACKGROUND OF THE INVENTION

This invention concerns desiccant-coated substrates and particularly desiccant-coated substrates that are useful in air treatment systems, for example, in heating, ventilation, and air conditioning ("HVAC") systems, and methods for making them.

Desiccants, their properties, and their uses (for example, in air treatment) and standards for air treatment and air quality are well-known. See, e.g., U.S. Pat. Nos. Re.29,932; 2,723,837; 2,926,502; 3,009,540; 3,009,684; 3,024,867; 3,024,868; 3,125,157; 3,266,973; 3,338,034; 3,528,224; 3,666,007; 3,844,737; 3,889,742; 4,012,206; 4,014,380; 4,021,590; 4,025,668; 4,036,360; 4,040,804; 4,081,024; 4,093,435; 4,109,431; 4,113,004; 4,130,111; 4,134,743; 4,140,458; 4,162,934; 4,172,164; 4,180,126; 4,222,244; 4,246,962; 4,255,171; 4,290,789; 4,325,220; 4,341,539; 4,346,051; 4,365,979; 4,382,807; 4,402,717; 4,431,456; 4,432,409; 4,449,992; 4,460,388; 4,484,938; 4,505,976; 4,527,398; 4,529,420; 4,540,420; 4,582,129; 4,594,860; 4,595,403; 4,635,446; 4,680,248; 4,723,417; 4,729,774; 4,747,346; 4,769,053; 4,808,505; 4,810,609; 4,871,607; 4,875,520; 4,886,769; 4,911,775; 4,919,899; 4,924,934; 4,948,392; 4,959,970; 5,002,116; 5,026,531; 5,045,295; 5,052,188; 5,120,694; 5,122,403; 5,125,195; 5,140,450; and 5,148,374; East Germany Patent No. 133855; Japan Application Nos. 53-36359 and 52-83907; EPO Application No. 0 030 863; and non-patent literature, including "EXCLU-SIEVE™—Total Energy Recovery Systems—The Semco Air System," SEMCO Mfg., Inc., 8 pages (1991); "EXCLU-SIEVE™—Heat Wheel Retrofit Program—The Semco Air System," SEMCO Mfg., Inc., 6 pages (1991); "EXCLU-SIEVE™—Design and Selection Manual—The Semco Air System," SEMCO Mfg., Inc., 11 pages (1991); "EXCLU-SIEVE™—Packaged Energy Recovery Systems—The Semco Air System," SEMCO Mfg., Inc., 33 pages (1991); "SEMCO EXCLU-SIEVE™—Technical Bulletin 509," SEMCO Mfg., Inc., 2 pages (1991); "SEMCO EXCLU-SIEVE™—Application Bulletin 508," SEMCO Mfg., Inc., 2 pages (1991); "SEMCO EXCLU-SIEVE™—Application Case History Bulletin 507," SEMCO Mfg., Inc., 2 pages (1991); "SEMCO EXCLU-SIEVE™—Application Case History Bulletin 506," SEMCO Mfg., Inc., 2 pages (1991); "Air exchanger eliminates cross contamination in animal lab," reprint from *Consulting-Specifying engineer*, 1 page (January 1990); "IAQ and Office Buildings: An EXCLU-SIEVE™ Solution," ASHRAE Journal's Sipplier Capabilities Supplement," pages S-44 and S-45 (August 1990); "Affordable Fresh Air is Now a Reality with EXCLU-SIEVE™ Total Energy Recovery," 1-page advertisement, SEMCO Mfg., Inc.; "A SEMCO EXCLU-SIEVE™ Retrofit ... the workable solution," 1-page advertisement, SEMCO Mfg., Inc.; "EXCLU-SIEVE™ Design Solutions: Animal and Chemical Research Laboratories," Bulletin 504, Issue 1, SEMCO Mfg., Inc., 4 pages (July 1989); "Indoor Air Quality—A Fresh Solution," 1-page advertisement, SEMCO Mfg., Inc.; *The Dehumidification Handbook*, published by Cargocaire Engineering Corporation, 103 pages (copyright 1982, fourth printing November 1984); C. Bayer et al., "Results of Chemical Cross-contamination Testing of a Total Energy Recovery Wheel—Phase I," Georgia Institute of Technology, 8 pages (Jun. 5, 1991); "Union Carbide Molecular Sieves," page 4; "Molecular Sieves Manufactured by Davison Chemical," page 6; "Ethanol Drying Using Davison Molecular Sieves," Davison Chemical Division of Grace, page 3; "Molecular Sieves—SILIPORITE," page 4; "Davison Silica Gels," Introduction to Silica Gel and Silica Gel Application Guide (3 pages); "Davison 5A Molecular Sieves," Davison Chemical Division of Grace, 4 pages; *Energy Recovery Equipment and Systems*, SMACNA, Inc., page 6.5; D. W. Breck, *Zeolite Molecular Sieves*, pages 3,4, and 636; *Methods of Dehumidification*, Cargocaire Engineering Corporation handbook, pages 3–17 and 3–18; *ASHRAE™ STANDARD 62-1989—Ventilation for Acceptable Indoor Air Quality*, American Society of Heating, Refrigerating and Air-Conditioning Engineers, Inc., pages 1, 6–12, 15, 23, 24 (1989); C. Downing, "Tech Brief#15—Desiccant Air-Conditioning," Industrial Energy Extension Service of Georgia Tech, 4 pages (1989); "Finally. Superior Technology Makes Quality Indoor Air Affordable," SEMCO Incorporated, 1-page advertisement; *Hawley's Codensed Chemical Dictionary*, entry for "molecular sieve," pages 792–793 (11th edition 1987); "Senex Enthalpy Recovery Technical Manual," Cargocaire Engineering Corporation, 27 pages; and "Senex Energy Recovery—Cargocaire Bulletin 3315," Cargocaire Engineering Corporation, 6 pages. All of the documents identified and/or discussed herein, including all of the foregoing documents, are incorporated herein in their entirety for all purposes.

Methods are known for adhering particles of desiccant (e.g., molecular sieve particles, silica gel particles) to substrates to form desiccant-coated substrates used for air treatment, for example, heat and/or moisture recovery wheels that can be used in HVAC systems. Such wheels include total energy recovery (or enthalpy) wheels, which remove heat and moisture from one airstream and transfer them to another airstream, and dehumidification wheels, which transfer a significant amount of moisture while attempting to minimize heat transfer from one airstream to another. For example, it is known to make an enthalpy wheel, which has a thin (one-thousandth of an inch, i.e., 1 mil) layer of desiccant coating on each of the two major faces of its foil-like substrate, by saturating molecular sieve particles with water, dispersing them in an organic solvent containing a polyurethane binder composition to form a slurry, coating the slurry onto one major face of an aluminum foil substrate using a Rotogravure printing-type process, heating the composite sufficiently to set the binder to adhere the particles to the substrate and to cause the water to vaporize to prevent the binder from occluding the pore openings of the desiccant particles, repeating those steps to adhere a layer of desiccant particles to the other major face of the substrate, and then forming the wheel from the final composite. See also U.S. Pat. Nos. 3,338,034; 4,036,360; 4,769,053; 5,052,188; and 5,120,694.

U.S. Pat. No. 3,338,034 concerns adsorbent-coated thermal panels, specifically non-porous panels coated with thin layers of gas adsorbent adapted for rapid heating and cooling. The panels may be made of metal, preferably aluminum, stainless steel, or copper, and zeolite molecular sieves are preferred (column 2, lines 12–41). Preferably the adsorbent is bonded to the panel wall using an inorganic binder (e.g., clays) substantially free of any organic binder (column 3, lines 9–49). After the adsorbent-binder mixture has been applied to the surface of the panel wall, desirably the adsorbent is heated sufficiently to set or cure the binder and thereby bind the adsorbent to the panel. If the adsorbent is a zeolite, the heating also serves to liberate water adsorbed by the zeolite molecular sieve. See column 3, lines 50–62. The adsorbent may be mixed with the binder to form an aqueous slurry (e.g., column 4, lines 35–38). Gases that can be adsorbed include water, carbon dioxide, and vaporized organic liquids (column 5, lines 1–4).

U.S. Pat. No. 4,036,360 concerns a package having a desiccant composition. This patent refers to prior art packages at column 1, lines 22–41, including one that uses microporous polyurethane bonding a nylon mesh to form a sheet material (U.S. Pat No. 3,326,810). This patent uses prepolymerized polyurethanes to bind large quantities of desiccants such as zeolites (column 2, lines 7–39). Other organic resin can be mixed with the polyurethane (column 3, lines 10–18). Example 1 shows tetrahydrofuran mixed with polyurethane and silica gel and then coated onto polyester film.

U.S. Pat. No. 4,769,053 (assigned to Semco) concerns total enthalpy air-to-air rotary energy exchangers, also known as total heat wheels, and total heat exchange media employed in those wheels. A layer of coating composition comprising a molecular sieve material is applied to at least a portion of the surface of the sensible heat exchange material. The substrate may be a foil material of, e.g., aluminum, stainless steel, kraft paper, nylon fiber paper, mineral fiber paper, asbestos, or plastic (column 4, lines 56–61). The heat exchange media (molecular sieve material) adsorbs water but not contaminants, such as hydrocarbons, carbon monoxide, nitrogen dioxide, and sulfur dioxide (column 3, lines 18–30). Suitable molecular sieve materials are described at column 5, line 4, to column 6, line 41, and preferably have a pore diameter of about 3 Angstroms. Suitable binders are set forth at column 6, lines 41–58, and include polyurethanes, nitrile-phenolics, water-based binders, and alkyd-based resins. The binder composition preferably includes a solvent such as toluene (column 6, lines 58–61). Methods of making the heat exchange media are set forth at column 6, line 42, to column 7, line 19. The binder and molecular sieve material should be applied so that the binder does not block the pores of the molecular sieve, which would destroy the ability of the molecular sieve to function (Id.).

U.S. Pat. No. 5,052,188 concerns a process for reducing the polarity on the internal surfaces of various zeolites having an $SiO_2$ to $Al_2O_3$ ratio of at least about 3 and an average pore diameter size within the range of from about 4 to about 10 Angstroms. The modified zeolites are prepared by heating the starting zeolite in an aqueous medium also containing an acid or a source of ammonium ions to at least partially dealuminize the zeolite and thereby increase the ratio of silicon to aluminum present in the tetrahedral structure. The process also provides for the hydrogen ion exchange with respect to those zeolites that contain significant amounts of metallic cations in the structure, thereby replacing the bulky metallic cations with less bulky hydrogen ions, which in turn increases the water adsorptive capacity of the zeolite. Achievement of the appropriate equilibrium between reduced surface polarity and increased sorptive capacity is said to yield zeolite materials having an isotherm with a separation factor within the range of from about 0.07 to about 0.1. Those modified zeolites are said to be ideal desiccants for gas-fired air conditioning and dehumidification systems, for example, systems using regenerable rotary desiccant wheels.

U.S. Pat. No. 5,120,694 concerns a method of coating an aluminum substrate (e.g., a foil) with a solid adsorbent (e.g., silica gel or a molecular sieve) comprising heating the surface of the substrate, contacting the surface with a slurry containing the adsorbent and a binder, and heating the coating to form a hardened surface. Suitable binders include clay (column 5, lines 8–30). The slurry may contain a dispersing agent or surfactant to aid in suspending the particles or to vary the slurry viscosity, e.g., a polymeric carboxylic acid or tetrasodium pyrophosphate (column 6, lines 5–15). The suspending liquid for the slurry is preferably water (column 6, lines 16–43). The coated product may be used in a desiccant wheel for cooling, refrigeration, and dehumidification (column 9, lines 20–29).

Rotary air-to-air total energy exchangers may be used in the HVAC field to recover both sensible energy (from a temperature change) and latent energy (from adsorbing water) from an exhaust air stream and then exchange these with an incoming air supply stream. The ability to recover the latent energy is of significant interest because such recovery occurs when, and as a result of, dehumidifying the outdoor air during a cooling cycle and from humidifying the outdoor air during a heating cycle, thereby reducing the energy demands required to condition outdoor air during those cycles.

The rotary wheel in such a total energy recovery system typically rotates at about 20 revolutions per minute and is commonly a thin substrate (e.g., a 2-mil thick aluminum foil) coated on both sides with a particulate desiccant in a binder matrix (typical coating thickness of about 1 mil on each side). Because the primary function of such a wheel is to recover both energy and moisture, because the desiccant readily picks up moisture and has a relatively low heat capacity, and because the substrate readily picks up heat but not moisture, the mass of desiccant in such a wheel is relatively low (about 15–30% of the total wheel mass) and the mass of the substrate (e.g., aluminum) is relatively high (about 70–85% of the total wheel mass). Additionally, the speed of revolution is necessarily high relative to the flow of air being processed to increase the rate at which heat and mass can be transferred from one air stream to the other air stream.

In contrast, a rotary wheel used for dehumidification only and not for total energy recovery has relatively less substrate mass (40–50%), relatively more desiccant mass (50–60%), and rotates more slowly (e.g., 0.25 revolutions per minute). That increases the amount of water that can be adsorbed and reduces the amount of carry-over heat that is transferred to the cooler air stream. A desiccant used for such a wheel desirably has as high a water adsorption capacity as possible and as much desiccant mass on the wheel as is consistent with technical and economic constraints (desirably, coating thicknesses of more than 1 mil). Furthermore, although some non-desiccant mass must be used to carry and support the desiccant (i.e., the substrate and the binder), the wheel should have as little non-desiccant mass as possible because such mass is dead weight and reduces the wheel's dehumidification efficiency and increases the energy required for regeneration.

Regardless of the type of wheel or other desiccant monolith (i.e., structural unit comprising the substrate carrying the desiccant particles) used or desiccant-based system in question, the binder holding the desiccant particles to the substrate should not significantly interfere with the functioning of the desiccant (e.g., should not occlude the pores of the desiccant or otherwise adversely affect its adsorptive or desorptive capabilities), should facilitate formation of the monolith (e.g., make coating the surface of the substrate with desiccant easy), should adhere to the desiccant tightly (to prevent loss of desiccant from the binder-desiccant coating layer, for example, by dusting), should present a readily cleanable surface, and should adhere the binder-desiccant coating layer tightly to the substrate. The binder must also function under the specified operating conditions, e.g., in the specified thermal and chemical environment. For example, a desiccant-coated total heat wheel is required to operate at temperatures of up to only about 100 degrees Fahrenheit (about 38° C.). In contrast, a desiccant-coated dehumidification wheel should not be adversely affected by temperatures up to about 350 degrees Fahrenheit (about 177° C.) and must be able to be repeatedly cycled between first temperatures in the range of 50 to 100 degrees Fahrenheit (about 10° to 38° C.) and second temperatures in the range of 300 to 350 degrees Fahrenheit (about 149° to 177° C.) without any adverse consequences, e.g., delamination of the binder-desiccant coating from the substrate.

Some early dehumidification wheels utilized a honeycomb paper impregnated with sodium silicate to form a backbone, which was then impregnated with a desiccant. Because absorbent desiccants such as lithium chloride, calcium chloride, and lithium bromide deliquesce and change from solid to liquid upon saturation, this type of desiccant could be easily deposited into the paper backbone by dipping the honeycomb wheel into a solution of the desiccant.

However, a significant problem with this type of desiccant was its loss from the wheel if the desiccant was allowed to reach saturation, although that usually could be avoided because of the high absorption capacity of such compounds (they can hold up to twice their own weight in water). Even so, problems occurred when such wheels became wet, came into contact with high humidity, or came into contact with pollutants such as sulfur dioxide and nitrogen dioxide. Also, manufacturing such wheels required numerous steps, including forming the special paper, winding and corrugating the paper to form the honeycomb, forming a silicon dioxide backbone by dipping the honeycomb into an aqueous sodium silicate solution, heating to drive off the water, impregnating with desiccant (e.g., LiCl) in a water bath, heating to drive off the water, grinding the wheel surface flat to open plugged flutes of the honeycomb, and hardening the surface. Use of that manufacturing procedure made mass production difficult and increased cost.

An advance over wheels utilizing absorbent desiccants is the use of solid adsorbents such as silica gel, activated alumina, and molecular sieves because they are chemically stable and do not deliquesce. Because solid adsorbents adsorb water in an amount equal to only a fraction of the their own weight, wheels using such desiccants must carry significantly more adsorbent mass than the earlier wheels (e.g., four to six times as much desiccant mass). To accommodate this much higher desiccant mass, some current dehumidification wheels are made from sheets formed using papermaking equipment from a mixture of pulp, desiccant, and binder in which the desiccant becomes an integral part of each sheet. However, sheets containing 50% or more desiccant (a desiccant wheel having acceptable performance needs at least 50% of its mass to be active desiccant) are difficult to form into honeycomb media and must be handled carefully because of decreased web strength resulting from the high desiccant loading. This makes mass production difficult and increases costs.

Other current dehumidification wheels utilizing solid adsorbents are made by preparing special paper, winding and corrugating the paper to form the honeycomb wheel, impregnating with sodium or ethyl silicate, converting the silica to silica gel using an acid or base, heating to dry the silica gel backbone and eliminate organic materials, grinding the wheel surface flat to open plugged flutes of the honeycomb, and hardening the surface. However, the dipping steps result in uneven film coatings and limit the amount of active desiccant that can be deposited on the wheel. Furthermore, the multi-step process is complex and makes the wheels costly to prepare.

Thus, there is a continuing need for efficient desiccant-based dehumidification wheels that can be easily and economically produced using environmentally lower-impact production techniques (e.g., without organic solvents), for desiccant-coated substrates that can be used to make those wheels, and for desiccant-coated substrates in general in which the binder matrix of the coating is sufficiently breathable so that the material(s) to be adsorbed can reach the desiccant particles quickly enough, in which the desiccant particles in the coating have a high percentage of their original capacity to adsorb and desorb, and in which the desiccant-coated substrate has sufficient flexibility and the coating has sufficient adherence to the substrate so that the desiccant-coated substrate can be formed into shapes having abrupt radii without the coating losing its integrity or its adherence to the substrate. There is also a need for desiccant-coated substrates that have thick coatings (i.e., coatings 2 mils thick or more per side) and in which the desiccant particles constitute a high percentage by weight of the coating. There is also a need for desiccant-coated substrates that have thick even coatings, i.e., a coating that does not vary significantly in its thickness along a given substrate. There is also a need for desiccant-coated substrates that can be used at temperatures above 150 degrees Fahrenheit (about 66° C.), preferably above 200 degrees Fahrenheit (about 93° C.), and particularly for substrates that can be repeatedly cycled during use between first temperatures in the range of 50 to 100 degrees Fahrenheit (about 10° to 38° C.) and second temperatures in the range of 300 to 350 degrees Fahrenheit (about 149° to 177° C.). There is also a need for desiccant-coated substrates in which the desiccant comprises two or more different desiccants that desirably are as well-intermixed (i.e., homogeneous) as possible in the coating layer. There is also a need for devices for air treatment besides dehumidification wheels that utilize such desiccant-coated substrates. Finally, there is a need for cost-effective methods for making such substrates and dehumidification wheels and other air treatment devices.

SUMMARY OF THE INVENTION

Desiccant-coated substrates, dehumidification wheels and other gas (e.g., air) treatment devices utilizing those substrates, and methods of manufacture that have those features and satisfy those needs have now been developed.

Broadly, the desiccant-coated substrate of this invention comprises a coating layer and a substrate, the coating layer being from about 2 mils to about 10 mils thick and comprising a water-based organic binder and at least 75% by weight desiccant, the desiccant being in the form of particles and the particles having pores, the coated substrate being sufficiently flexible and the coating layer having sufficient adherence to the substrate so that the coated substrate can be formed into shapes having abrupt radii, the desiccant particles in the desiccant-coated substrate having at least 75% of their original adsorption capacity, the binder having good breathability, and the desiccant-coated substrate being able to be used at temperatures over 150 degrees Fahrenheit (about 66° C.).

The gas (e.g., air) treatment device of this invention comprises a desiccant-coated substrate capable of being used at temperatures over 150 degrees Fahrenheit (about 66°

C.), the device having passageways for gas to flow through and contact the desiccant, the desiccant being in the form of particles and the particles having pores, the desiccant-coated substrate comprising a coating layer and a substrate, the coating layer being from about 2 mils to about 10 mils thick and comprising a water-based organic binder and at least 75% by weight dry desiccant, the coated substrate being sufficiently flexible and the coating layer having sufficient adherence to the substrate so that the coated substrate can be formed into shapes having abrupt radii, the desiccant particles in the coated substrate having at least 75% of their original adsorption capacity and the binder having good breathability.

One process of this invention is a process for making a desiccant-coated substrate capable of being used at temperatures over 150 degrees Fahrenheit (about 66° C.), the desiccant being in the form of particles and the particles having pores and being adhered to the substrate by a binder, the coated substrate being sufficiently flexible and the coating having sufficient adherence to the substrate so that the coated substrate can be formed into shapes having abrupt radii, the desiccant particles in the coated substrate having at least 60% of their original adsorption capacity and the binder having good breathability; said process comprising the steps:

(a) forming an aqueous suspension comprising particles of one or more desiccants, a water-based organic binder, a suspending agent to help maintain the desiccant particles in suspension, and an organic pore-clearing agent at least some of which enters at least some of the pores of the desiccant particles;

(b) depositing the suspension on the substrate; and (c) causing the binder of the deposited suspension to set to adhere the deposited desiccant particles to the substrate and causing at least some of the pore-clearing agent to leave the pores of the desiccant particles to prevent the binder from occluding at least some of the pores of the adhered desiccant particles, thereby to form a desiccant-coated substrate capable of being used at temperatures over 150 degrees Fahrenheit (about 66° C.) and of sufficient flexibility and a coating having sufficient adherence to the substrate so that the desiccant-coated substrate can be formed into shapes having abrupt radii and in which the desiccant particles in the coated substrate have at least 60% of their original adsorption capacity and the binder has good breathability.

Another process of this invention is a process for making a device for gas treatment comprising a desiccant-coated substrate capable of being used at temperatures over 150 degrees Fahrenheit (about 66° C.), the device having passageways for gas to flow through and contact the desiccant, the desiccant being in the form of particles and the particles having pores and being adhered to the substrate by a binder, the coated substrate being sufficiently flexible and the coating having sufficient adherence to the substrate so that the coated substrate can be formed into shapes having abrupt radii, the desiccant particles in the coated substrate having at least 60% of their original adsorption capacity and the binder having good breathability; said process comprising the steps:

(a) forming an aqueous suspension comprising particles of one or more desiccants, a water-based organic binder, a suspending agent to help maintain the desiccant particles in suspension, and an organic pore-clearing agent at least some of which enters at least some of the pores of the desiccant particles;

(b) depositing the suspension on the substrate;

(c) causing the binder of the deposited suspension to set to adhere the deposited desiccant particles to the substrate and causing at least some of the pore-clearing agent to leave the pores of the desiccant particles to prevent the binder from occluding at least some of the pores of the adhered desiccant particles, thereby to form a desiccant-coated substrate of sufficient flexibility and a coating having sufficient adherence to the substrate so that the desiccant-coated substrate can be formed into shapes having abrupt radii and in which the desiccant particles in the coated substrate have at least 60% of their original adsorption capacity and the binder having good breathability; and (d) forming the desiccant-coated substrate into shapes having abrupt radii and having passageways for the flow of gas arranged so that gas flowing through the passageways comes into contact with the desiccant.

In preferred embodiments the desiccant-coated substrate is used in a gas treatment device that is a regeneratable dehumidification wheel, the suspending agent is also the pore-clearing agent and is N-methyl-2-pyrrolidone, the water-based organic binder is polyurethane, the coating is from 2 to 10 mils thick, more preferably from 3 to 8 mils thick, the desiccant particles in the coating on the substrate have at least 75% of the adsorption capacity of the original particles, more preferably at least 90% of the capacity of the original particles, the desiccant is at least 85% by weight of the coating layer, the one or more desiccants are chosen from the group consisting of molecular sieves and silica gels, and the binder is pH-sensitive and a pH-adjusting agent is used to adjust the pH of the mixture containing the desiccant and binder that is applied to the substrate so that the binder will function properly. Other features and advantages of the invention will be apparent from this disclosure.

DETAILED DESCRIPTION OF THE INVENTION

The desiccant-coated substrates of this invention may be used for any purpose concerning removal of moisture and/or other gaseous substances in any device and in any field; however, they find particular use in the field of gas treatment and most particularly in the field of air treatment. In that field, they find particular use in heating, ventilation, and air conditioning ("HVAC"). In that specific area, the substrates find particular use in devices that remove moisture from one air stream and transfer the moisture to a second air stream. Most preferably, the substrates of this invention are used in regeneratable rotary wheels that are used in dehumidification systems.

The monolith, which comprises the substrate carrying the desiccant, may have any shape or size and may contain the desiccant particles on its inner surface or surfaces, on its outer surface or surfaces, or on both its inner and outer surfaces. A particularly useful monolith will be in the shape of a wheel, for example, a total energy recovery wheel or a dehumidification wheel, and the desiccant particles will be on the surface of the passageways for air flow that run from one major face of the wheel to the other major face. Desirably, such a wheel will have a honeycomb structure, and its manufacture is further described below.

The choice of substrate is not critical and can be any substrate that can function under the conditions of intended use in accordance with this invention. Thus, the substrate may have any size or shape and be of any material that has the required physical and chemical properties. Desirable properties include good strength (e.g., tensile), temperature resistance, durability, and the appropriate degree of rigidity (the substrate must be both sufficiently stiff but yet flexible enough to be bent for certain applications). If the substrate is to be bent or otherwise formed into a non-planar shape (e.g., corrugated with triangular, sinusoidal, or square flutes), the substrate should have sufficient formability and memory. Suitable substrates include planar and non-planar (e.g., corrugated) substrates made of metal, natural and synthetic polymers, and inorganics (e.g., ceramics). The substrates may be formed from fibers. Thus, the substrates may be of aluminum, stainless steel, polyester, PETG (polyethylene terephthalate glycol), polypropylene, polytetrafluoroethylene, and/or fibrous webs incorporating polymer fibers, metal fibers, ceramic fibers, and/or cellulose fibers. The preferred materials include aluminum and polymer films of polyester (e.g., Mylar polyester) or of PETG, of which aluminum is most preferred because it is relatively low cost, easily coated and formed, has a high maximum working temperature, and is non-inflammable.

Generally, thinner substantially planar substrates prior to coating are preferred and suitable thicknesses range from about 0.5 mils to 5 mils, usually 0.6 mils to 4 mils, and preferably 0.8 to 2 mils, of which about 1.3 mils is most preferred for a dehumidification wheel. Two or more different substrates may be used together, e.g., in the same device for the treatment of air or other gases. Thus, for example, a formable coated substrate may be corrugated and joined to a relatively less formable coated substrate, which composite article is then rolled to form a honeycomb for a dehumidification wheel.

The substrate may be coated on only one side or one more than one side. If the substrate has two major faces, e.g., a foil, both major faces may be coated with the desiccant-binder coating. If the substrate has more than two major sides or faces, e.g., a parallelepiped, all or fewer than all of the faces may be coated. A preferred substrate for a dehumidification wheel is an aluminum foil approximately 1 mil thick that is coated on both major faces and is thereafter formed into a honeycomb as described below.

The desiccant can be any particulate desiccant and may be a mixture of particles of different sizes of the same desiccant or a mixture of particles of different desiccants of the same or different sizes. The choice of desiccant is not critical and may be any desiccant particles that can function under the conditions of intended use in accordance with this invention, i.e., the desiccant particles should have the required physical and chemical properties. For example, the desiccant particles should have sufficient mechanical strength and chemical resistance. Thus, permissible desiccants include naturally occurring, modified, and synthetic aluminosilicates, aluminas, silica gels, molecular sieves or zeolites, activated carbon, and activated alumina. Although the particle size is not critical, the size of the desiccant particles generally ranges from 3 to 100 microns, usually from 3 to 25 microns, and preferably from 3 to 10 microns. A particularly preferred desiccant for dehumidification wheels comprises particles of three different desiccants, namely, silica gel, a modified 13× molecular sieve, and a hydrophobic adsorbent, and is further described below.

The binder forming the matrix of the coating layer in which the desiccant particles reside can be any binder that can function under the conditions of intended use in accordance with this invention. Thus, the binder must be compatible with the substrate, the desiccant, and the other components of the desiccant-coated substrate and must have the required chemical and physical properties. For a dehumidification wheel, the binder should be able to function under temperatures of up to about 350 degrees Fahrenheit (about 177° C.). For other applications, the binder need not function at temperatures as high. Desirably, the coating mixture, which contains binder, desiccant particles, and other components, is relatively easy to apply to the substrate.

The binder should have sufficient flexibility, adhesion to the desiccant particles and substrate, durability, breathability, and strength. The binder desirably is readily cleanable and should retard loss of desiccant from the coating layer (e.g., by dusting). For a substrate that is corrugated to form, for example, a dehumidification wheel, the binder must adhere strongly to the substrate and the desiccant particles because it is preferred that the substrate be coated and then corrugated rather than being corrugated and thereafter coated.

The binder should permit the desiccant particles in the final desiccant-coated substrate to have sufficient adsorption capacity. Solid desiccants adsorb materials into their pores, and thus in the final desiccant-coated substrate the binder should not block or occlude the pores of the desiccant particles. That means desirably that neither the pore openings on the surface of the particles or the internal pore volume inside the particles should be occluded. If the pores are plugged or the particles are completely encapsulated, overall adsorptive capability is reduced.

The binder network (or matrix) connecting the desiccant particles to one another and to the substrate should be sufficiently porous to allow the materials that are to be adsorbed (e.g., water vapor) to pass through the binder matrix and reach the contained desiccant particles, that is, the binder matrix should have good breathability. Even if the binder does not occlude the pores of the desiccant particles, if the mass transport of material to be adsorbed is unduly hindered by the binder (that is, the binder matrix lacks good breathability), the adsorptive capability and adsorption rate of the desiccant-coated substrate will be too low. For example, if water is the material to be adsorbed, the water should reach all of the available desiccant within a period of from about 1.5 to 4 minutes for a typical rotating dehumidification wheel. Using a binder that does not unduly hinder mass transport is particularly important if thick coatings are used because as the coating thickness increases, any significant retarding effect by the binder on mass transport through it becomes more noticeable. For example, with a thick coating (e.g., 4 mils), water vapor needs to pass through only about 1 mil of binder to move from the surface of the coating to a desiccant particle that is 1 mil below the surface of the coating but needs to pass through about 4 mils of binder to reach a desiccant particle that is at the bottom of the coating and near the substrate surface.

Although the binder can be water-based or solvent-based, desirably the binder is a water-based material so that organic solvents are not needed and the carrier or slurry medium of the coating composition can be water. That has obvious environmental, cost, and other advantages. The binder desirably is an organic material (e.g., a carbon-containing material such as a polymer) as opposed to an inorganic material (e.g., clay).

The preferred binders are solvent-based polyurethane, nitrile/phenolic-based, water-based acrylics, and water-based polyurethane. The most preferred binder is a water-based polyurethane sold by Roymal Coatings & Chemical Co., Inc. (Newport, N.H.) under the name Polyurethane Aqueous Dispersion #42823. This material is a polyurethane emulsion containing about 37% solids and comprises aliphatic or aromatic isocyanate plus polyester resin.

The desiccant coating mixture that is applied to the substrate thus contains desiccant and binder and will generally also contain a solvent or slurry medium. For example, along with the preferred water-based polyurethane binder and desiccant particles, the coating mixture will desirably also contain additional water as the slurry medium. Because different desiccants may have different pH values in water and because the binder may be pH-sensitive (e.g., it may not adhere sufficiently to the substrate above or below certain pH values), it may also be necessary to use a pH-adjusting agent to control the pH of the coating mixture to bring it to within a suitable range or to a particular value that permits the coating process of this invention to be used.

For example, most molecular sieve desiccants are quite basic in solution and silica gels are typically quite acidic. The most preferred water-based polyurethane binder desirably is used in this invention with a neutral to mildly basic pH. Thus, if a silica gel were to be used as the desiccant along with the preferred binder, a pH-adjusting agent would desirably be added to bring the pH from highly acid (silica gel in water) to neutral or mildly basic (the preferred pH for that binder).

Whether or not a pH adjustment because of the desiccant should be made to maximize binder properties, it may be necessary or desirable to adjust the pH because of other components in the coating composition. Additionally, it may be desirable to adjust the pH because of the substrate used. For example, if aluminum is used as the substrate, adhesion of the coating layer to the aluminum will generally be improved if the pH of the coating mixture is from about 7.5 to about 9.5.

The pH-adjusting agent may be any material that can adjust the pH of the coating mixture to the desired value so that the benefits of this invention can be obtained. Usually the pH-adjusting agent will be a single compound but it may also comprise one or more compounds. With water as a slurry medium and the preferred binder and desiccant mixture for a dehumidification wheel, ammonium hydroxide has been found to be a suitable pH-adjusting agent. Although the pH-adjusting agent may be added to the coating mixture at any point in its preparation, it is desirable to add the agent prior to addition of the binder. Furthermore, with water as the slurry medium and the preferred binder and desiccant mixture, it is desirable to add the pH-adjusting agent to the water prior to the addition of the desiccant.

It may be desirable for the coating mixture to contain a suspending agent to help maintain the desiccant particles in suspension so that the desiccant particles will not settle out and are evenly distributed in the coating mixture. For example, the coating mixture will generally be applied to the substrate from a reservoir of coating mixture. If the slurry first leaving the reservoir to coat the beginning of a particular section of substrate does not have as high a concentration of desiccant as the slurry leaving the reservoir to coat the end of that particular section of substrate, the beginning of that section of the substrate will contain less desiccant than the end of that section. In most application such uneven distribution of the desiccant would be undesirable.

Furthermore, even if the coating composition in the reservoir were kept well-mixed so that the mixture applied to the substrate was homogeneous, the desiccant particles might tend to settle after application and before setting of the binder. In other words, the particles might tend to fall to the bottom of the coating layer, which would result in the top of the coating layer being relatively poorer in desiccant and richer in binder and the bottom of the layer (near the substrate) being relatively richer in desiccant and poorer in binder. That in turn would tend to reduce the adsorptive capacity of the coated substrate and also tend to reduce the adhesion of the coating layer to the substrate because more of the desiccant would be farther from the top of the coating layer, resulting in more of the material to be adsorbed (e.g., water vapor) having to travel through more of the binder.

With a coating composition containing two or more different desiccants, the problem of maldistribution of the desiccant particles may be exacerbated if the different desiccants tend to remain in suspension to different degrees. For example, if the desiccant comprises desiccant S and desiccant T and desiccant S tends to settle out of suspension more than desiccant T does, in the absence of any suspending agent to counteract that tendency, the coating mixture removed from the reservoir for coating would tend to have a lower ratio of S to T as compared to the original bulk ratio of S to T in the entire coating mixture. Furthermore, even if the coating composition were kept well-mixed in the reservoir so that the ratio of S to T in the slurry applied to the substrate was the same as the original bulk ratio of S to T, the vertical cross-section of the coating on the substrate would tend to have an uneven distribution of S and T. That is because after the coating mixture was applied and before the binder had set to lock the particles in position, desiccant S would tend to settle to the bottom of the coating layer (towards the substrate) more than desiccant T would. This would be particularly apparent in a thick coating where the S particles might tend to be in the middle and bottom of the coating layer and the T particles might tend to be in the top and middle of the coating layer. This problem is further aggravated if three or more different desiccants are used, as in the preferred composition.

A suspending agent may also be desirable for maintaining the homogeneity of the coating mixture with respect to its other components. The suspending agent for the desiccant particles may be the same as or different from the suspending agent for the other constituents of the coating composition. Thus, the coating composition may contain one, two, or even more suspending agents.

Neither the suspending agent or agents or any other component of the coating mixture should interfere with the functioning of the desiccant (e.g., none of the components should occlude the pores of the desiccant in the final coated substrate or otherwise significantly reduce its capacity) or interfere with the breathability of the binder matrix or with the coating process (e.g., none of the components of the coating mixture should cause the binder to set improperly). For example, isopropyl alcohol was found to be suitable for use as a suspending agent under certain conditions with the preferred desiccant and binder, but under other conditions the isopropyl alcohol apparently reduced the breathability of the coated substrate and the adhesion of the coating layer to the aluminum substrate to undesirable levels.

Any suspending agent may be used that allows the benefits of this invention to be achieved. A particularly preferred suspending agent is N-methyl-2-pyrrolidone. Use of that compound with the preferred binder, desiccant, and substrate results in desiccant-coated substrates having good properties, including good adhesion of the coating layer to the substrate, good desiccant adsorption capacity, good binder matrix breathability, good flexibility, and good durability, and helps maintain homogeneity or well-mixing of the coating composition for extended periods of time. The quantity of suspending agent used should desirably be the minimum amount needed to achieve the desired effect. The preferred suspending agent can be used in low enough amounts (typically no more than about 15% by weight of the solid desiccant particle weight in the composition) so that the coating composition can be classified as a water-based system.

The coating composition desirably also contains an organic pore-clearing agent. "Organic" includes carbon-containing compounds as opposed to inorganic compounds such as water. The function of the pore-clearing agent is to prevent occlusion or blockage of the pores, which may result from encapsulation of the desiccant particle by the binder. Without being bound by any theory, the pore-clearing agent may prevent occlusion by breaking through the setting binder or by breaking through the set binder. Pore-clearing agents that prevent other types of occlusion or that function in other ways are all included within the term "pore-clearing agent" as used herein.

If the pore-clearing agent is to function by being placed in the pores of the desiccant particles prior to setting of the binder, the pore-clearing agent may be placed in the pores prior to addition of the particles to the coating composition or after the particles have been added to the coating composition. The pore-clearing agent may then be expelled from the pores during or after setting so as to punch holes in the binder that would otherwise occlude the pore openings. In addition, the presence of the pore-clearing agent inside the pores may also prevent the binder and any other potentially occluding substances from entering the pores. With such an agent, it is desirable that the kinetic diameter of the pore-clearing agent be less than the pore diameter of the desiccant(s) utilized so that at least a portion of the pore-clearing agent can be co-sorbed into the desiccant along with the water that enters during mixing of the components to form the coating composition (when water is the solvent or suspension medium).

If the solvent (preferably water) and the pore-clearing agent are to be removed by heating the "wet" coating after it has been applied to the substrate, it is desirable that the pore-clearing agent be less volatile (have a higher boiling point) than the solvent (preferably water) so that the binder will be set to some extent when the pore-clearing agent first starts and then continues to be driven out of the pores of the desiccant. (The bulk of the adsorbed water will have left the desiccant pores before the bulk of the pore-clearing agent starts to leave.) In this case, the pore-clearing agent will force its way through the binder matrix, thereby creating porosity in the binder matrix. If the binder matrix is sufficiently set at that time, some or all of that porosity will become permanent, thereby imparting breathability to the final coated substrate. As noted above, sufficient binder matrix breathability (i.e., "good breathability") is needed during operation to allow the materials to be adsorbed to reach the desiccant particles and to allow the materials to be adsorbed to reach the desiccant particles quickly enough.

Most desirably, the pore-clearing agent is the last component of the coating mixture to be removed from the coating mixture during the coating process. Accordingly, if heat is used to set the binder and remove the solvent, pore-clearing agent, suspending agent, and any other volatile components, the pore-clearing agent should also have a lower volatility (i.e., a higher boiling point) than any of those other components (unless, for example, the pore-clearing agent is also the suspending agent).

An additional desirable function of the pore-clearing agent in that case results from its final slow release throughout the coating layer. Specifically, it helps "stabilize" the coalescing and setting of the binder so that the binder sets evenly throughout the thickness of the coating layer and prevents "skinning over" of the outer surface of the coating (i.e., formation of an undesirable outer skin). For example, if a pore-clearing agent and suspending agent (desirably the same material) are not utilized, the solvent might be driven off unevenly, which would tend to cause the upper portion of a coating thicker than 1 to 2 mils to cure or set completely while the lower portion remained uncured. As a result, the solvent from the lower portion would have to try to break through the upper set portion. That in turn would tend to cause formation of blisters and holes on the outer upper surface of the coating and also tend to cause portions of the coating to blow off of the substrate ("flaking").

If the suspending agent is not also the pore-clearing agent, it is preferred that the suspending agent have a volatility (boiling point) between that of the solvent and that of the pore-clearing agent and, most preferably, closer to that of the pore-clearing agent. If the volatility of the suspending agent is not closer to that of the pore-clearing agent, the suspending agent may be driven off too quickly in the coating process, which might tend to cause the desiccant particles to undesirably settle out (towards the substrate) before the binder had set sufficiently.

The pore-clearing agent may be any substance that can perform the desired function and is compatible with the other constituents of the coating composition and allows the advantages of this invention to be achieved. Desirably, the pore-clearing agent is also another component of the coating composition. For example, it is preferred that the pore-clearing agent also be the suspending agent. Most unexpectedly, it has been found that N-methyl-2-pyrrolidone can function in the coating composition as both the suspending agent and the pore-clearing agent and thus that compound is preferred.

The coating mixture will generally have the following overall composition ranges for each component:

| Component | Weight Percent Range |
|---|---|
| Desiccant powder (dry) | 40 to 55 |
| Solvent | 20 to 40 |
| Binder | 10 to 20 |
| Suspending agent | 2 to 12 |
| Pore-clearing agent | 2 to 12 |
| pH-adjusting agent | .1 to 6 |

Compositions both inside and outside the scope of these ranges may be used, depending upon the particular desiccant used, the particular solvent used, the particular binder used, whether a suspending agent is used and what it is, whether a pore-clearing agent is used and what it is, whether a pH-adjusting agent is used and what it is, and whether any other materials are used in the coating composition and what they are.

A particularly preferred coating mixture using the preferred desiccant (described below) has the following composition:

| Component | Weight Percent |
|---|---|
| Desiccant powder (dry) | 45.4 |
| Water | 29.7 |
| Polyurethane emulsion (at about 37% solids) | 16.3 |

| Component | Weight Percent |
|---|---|
| N-methyl-2-pyrrolidone | 7.4 |
| Ammonium hydroxide | 1.2 |
| Total | 100.0 |

It is important with this composition that the following ratios be carefully controlled to maximize the benefits obtained with this invention: the ratio of binder to dry desiccant, the ratio of N-methyl-2-pyrrolidone to binder and dry desiccant, and the ratio of pH-adjusting agent (ammonium hydroxide) to dry desiccant. The ratio of water to dry desiccant will change depending on the particular desiccant employed. Even so, good results may still be achieved with the preferred composition if the amounts of its constituents are within the following ranges:

| Component | Weight Percent Range |
|---|---|
| Desiccant powder (dry) | 40 to 55 |
| Water | 20 to 40 |
| Polyurethane emulsion (at about 37% solids) | 10 to 20 |
| N-methyl-2-pyrrolidone | 2 to 12 |
| Ammonium hydroxide | .1 to 6 |

The preferred desiccant comprises a mixture of three different desiccants and is particularly useful for dehumidification wheels used in desiccant-based cooling systems because the preferred desiccant possesses a moisture adsorption isotherm that is most advantageous for such systems, more specifically, a moderate Langmuir Type 1 adsorption isotherm having a separation factor of from 0.05 to 0.13, desirably from 0.06 to 0.12, preferably from 0.07 to 0.11, and most preferably from 0.08 to 0.10. Separation factor is defined by the following equation in which "SC" is the loading fraction of water in dry desiccant, "FC" is the relative vapor pressure of water ($P/P_o$, where P is the partial pressure of water and $P_o$ is the partial pressure of water at saturation), and "R" is the separation factor:

$$SC=FC/(R+FC-(R \times FC))$$

The preferred desiccant comprises silica gel, a modified 13× molecular sieve, and a hydrophobic adsorbent (preferably a hydrophobic molecular sieve).

The preferred silica gel is a normal density (about 1.05 grams/cc) synthetic silica having an average pore diameter of about 25 Angstroms and a high surface area of about 675 square meters/gram. Preferably the size of the silica gel particles is uniform and is about 3 to 10 microns in diameter. Any silica gel having these characteristics can be used. Syloid Silica, grades 63 and 64, most preferably grade 63, marketed by W. R. Grace have been found to be particularly suitable.

The modified 13× molecular sieve is a conventional 13× molecular sieve in which at least 20% (and preferably at least 30%) of the sodium cations have been replaced by potassium. Replacement of more than 50% of the sodium cations may not be necessary or cost-effective. Molecular sieves of the 13× type and methods for exchanging sodium cations for potassium cations in molecular sieves are well-known to those skilled in the art (e.g., the method used to produce potassium 3A molecular sieve from the basic sodium 4A molecular sieve). The resulting pore openings in the potassium-exchanged 13× molecular sieve are about 8 Angstroms. Any 13× molecular sieve can be used as the starting material for making the preferred modified 13× molecular sieve. Conventional 13× molecular sieves marketed by W. R. Grace and U.O.P. have been found to be particularly suitable. This second component of the preferred desiccant mixture should preferably also be of uniform particle size and about 3 to 10 microns in diameter.

The hydrophobic adsorbent can be any material that in combination with the other two components of the preferred desiccant (the silica gel and the modified molecular sieve) provides the desired properties, including the above-described moderate Langmuir Type 1 adsorption isotherm. An example of a suitable hydrophobic adsorbent that can be used is a high silica Y-type molecular sieve marketed by U.O.P. under the name Purasiv-173 (or MHSZ-173). Alternatively, a hydrophobic silica gel may be used, e.g., a hydrophobic silica gel marketed by Cabot Corporation under the name Cab-O-Sil TS-610; however, the Purasiv-173 material is most preferred. This third component of the preferred desiccant should preferably also be of uniform particle size and about 3 to 10 microns in diameter.

The relative amounts of the three desiccant materials in the preferred desiccant is as follows (based on dry weight):

| Component | Weight Percent |
|---|---|
| Silica gel | 13–26, preferably 17–20, most preferably 19 |
| Modified 13X molecular sieve | 74–82, preferably 78–80, most preferably 79 |
| Hydrophobic adsorbent | 0–5, preferably 2–3, most preferably 2 |

Although the ingredients of the coating composition may be added to one another in any order, with the preferred coating composition, which contains the preferred three-component desiccant mixture, the preferred method of forming the coating mixture is as follows.

The solvent (water) and pH-adjusting agent (ammonium hydroxide) are placed in a first vessel that allows intensive mixing. The desiccant, preferably preloaded with water (i.e., equilibrated with water), is measured and placed in a second vessel. Because the preferred desiccant is a mixture, the three desiccant constituents are measured into the second vessel and mixed to insure homogeneity. Approximately 90% of the well-mixed desiccant is then added slowly to the first vessel and mixed, preferably with a cowles blade mixer, resulting in a thick paste. After the water is adsorbed into the desiccant paste (approximately 20 minutes), the N-methyl-2-pyrrolidone (pore-clearing agent and suspending agent) is added and mixed, as a result of which the viscosity of the slurry is significantly reduced. If the desiccant has not been preloaded with water, additional water will have to be added to the first vessel to replace the amount that enters the pores so that the liquid portion of the coating mixture contains the proper amount of water. The remaining 10% of the well-mixed three-component desiccant mixture in the second vessel is then added to the first vessel and the slurry is intensively mixed using the cowles blade mixer for about 20 minutes. It has been found that this slurry can be stored for extended periods and remixed as needed without any significant loss in performance.

When the slurry is to be applied, the slurry has added to it the water-based polyurethane and the resulting slurry is intensively mixed for about 30 minutes. This final formulation can be added directly to the coating machine for coating the substrate.

The coating formulation may be applied using any method capable of depositing a layer of the desired thickness onto the substrate. In some cases, the desired coating may be thick and the solids content of the formulation may be high. Even in those cases, conventional coating technology may be used. For commercial production, high speed equipment will generally be preferred. High speed coating systems utilizing Rotogravure rolls, Meyer rods, and double helically wound rods (e.g., Supercoat rods) have been found to be effective. A system using supercoat rods is preferred because it provided the most uniform coating density, was able to deposit coatings up to 8 mils thick (per side), and did not suffer from solids build-up over extended time periods (provided the desiccant coating suspension remained evenly mixed).

After the coating mixture is deposited on the substrate, the desiccant-coated substrate may be pulled at high speed (e.g., up to about 200 to 300 feet per minute; about 61 to 91 meters per minute) through a staged high temperature oven (temperatures of from 180 to 350 degrees Fahrenheit; about 82° to 175° C.) to dry or otherwise remove the solvent carrier, suspending agent, pore-clearing agent, and/or pH-adjusting agent and to set or cure the binder, thereby to anchor the desiccant particles in the binder matrix and firmly adhere the coating layer to the substrate. Other methods may be used to set or cure the binder and remove the solvent. Heating the substrate is advantageous because it not only can be used to cause at least certain types of binders to set, at the same time it also drives off volatile components, including the solvent (e.g., water), and it causes the pore-clearing agent to leave the pores of the desiccant particles, thereby preventing the binder from occluding the desiccant pores and imparting breathability to the binder. The cured desiccant-coated substrate my then be wound onto a roll or first cut to the desired width and then rolled.

If the desiccant-coated substrate is being used to form a dehumidification wheel, two rolls of the coated substrate may then be used. The coated substrate from one roll is run through a corrugation machine to form corrugations or flutes in the coated substrate ranging, e.g., in height from about 0.5 millimeters to about 2.5 millimeters and in width from about 0.7 millimeters to about 5 millimeters. The corrugation gears may have a forming pressure angle of from about 7 to about 60 degrees. The flutes may be triangular, sinusoidal, square, or any other shape suitable for the intended purpose, but sinusoidal is preferred.

The corrugated coated substrate is then combined with the uncorrugated flat coated substrate from the other roll. Desirably the two coated substrates are adhered or otherwise joined to one another at their points or lines of contact by any suitable means, e.g., by gluing using the same binder material as was used for the forming the coating layer. The points or lines of joinder will typically be where the peaks of the corrugated coated substrate touch the flat coated substrate, and the parts of the corrugated coated substrate not touching the flat coated substrate will define the passageways through which the air or other gas to be treated by the wheel will pass. Typically, corrugated and flat coated substrates are alternately wound and simultaneously joined to form the honeycomb wheel structure, which may then be placed into the wheel framework either as is or after cutting into segments, which segments are then reassembled in the framework.

The width of the wheel, which is equal to the length of the passageways for air flow during use, may range from 1 inch to 15 inches (about 25 to 381 millimeters) and typically will be about 10.5 inches (about 267 millimeters) for a dehumidification wheel. The diameter of the wheel may range from about 4 inches to 15 feet (about 102 millimeters to 4.6 meters). Larger or smaller wheel thicknesses and/or diameters may be used. As noted above, the desiccant-coated substrate may be formed into any other shape suitable for its intended purpose.

The present invention provides numerous benefits. For example, in addition to those previously discussed, manufacture of a honeycomb dehumidification wheel according to the present invention may be carried out at a significantly higher speed than that typically obtainable when using a known process involving a paper substrate. Also, because the coated substrate is cut to the desired width and dipping is not used to coat the substrate, the wheel can be wound flat and free from plugging, which eliminates the need to grind the surface of the wheel. Because the coated substrate is sufficiently strong, surface hardening is not required.

Another significant advantage of the present invention is that the coating layer has a high degree of adherence to the substrate and the coated substrate is sufficiently flexible.

Another significant advantage of the desiccant-coated substrates of this invention is that they can be formed into shapes having abrupt radii without any adverse effects (e.g., delamination of the coating layer from the substrate) because the coating layer (comprising desiccant and binder) adheres so strongly to the substrate (i.e., there is sufficient mechanical bond strength) and because the coated substrate has sufficient flexibility. "Shapes having abrupt radii" includes corrugated shapes (e.g., triangular, square, sinusoidal) having abrupt bend angles. Such a shape is exemplified by the shape resulting from corrugation using a corrugation gear having a pressure angle of 17 degrees. That shape has a net bend angle of 34 degrees (measured at the interior angle at the apex of the bend). Corrugated flutes formed in this manner have an inside flute height of about 1.5 millimeters and a base width of about 3.5 millimeters (measured between the initial and final apex of each flute) and are typically used in dehumidification wheels. The hydraulic diameter of this shape is about 1.2 millimeters.

If a desiccant-coated substrate of this invention can be formed into shapes having abrupt radii, that desiccant-coated substrate will also be formable into shapes having less than abrupt radii, i.e., into shapes having larger radii. That is because the tightness of the curve (and thus the stress on the desiccant-coated substrate) decreases as the radius of a bend in the desiccant-coated substrate increases. Thus, the claims should be understood as referring to desiccant-coated substrates that can be (but are not necessarily) formed into shapes having abrupt radii without any failure of the desiccant-coated substrate occurring (e.g., delamination of the coating layer from the substrate, cracking or fracturing of the coating layer). If the desiccant-coated substrates of this invention could not be successfully formed into shapes having abrupt radii, then desiccant-based dehumidification wheels (and other shapes) could not be produced from such coated substrates in a cost-effective manner.

One way to quantify the tightness of the bends that may successfully be made in a coated substrate of this invention (i.e., with any adverse effect on the coated substrate) is by specifying the minimum hydraulic radius of the shapes having such bends. Often the shapes that can be formed will have hydraulic diameters as small as 0.5 to 2.5 millimeters. The calculation of the hydraulic diameter for any given shape can be made by one skilled in the art. As is known, the hydraulic radius ($R_H$) is equal to the area of cross-section in question divided by its wetted perimeter, and the hydraulic diameter is equal to twice the hydraulic radius. See *Perry's Chemical Engineers' Handbook*, page 5–20 et seq. (4th edition 1963). For example, the hydraulic radius of a circle 5 millimeters in diameter is 1.25 millimeters (hydraulic diameter of 2.5 millimeters) and the hydraulic radius of a circle 10 millimeters in diameter is 2.5 millimeters (hydraulic diameter of 5 millimeters).

Another way to quantify the tightness of the bends that may successfully be made in a coated substrate of this invention (i.e., with any adverse effect on the coated substrate) is by specifying the pressure angle of the corrugation gears used to form the bends. Generally, the corrugation gear pressure angles will be in the range of from about 7 to about 60 degrees. Thus, the minimum angle of a bend that may be successfully formed in a desiccant-coated substrate of this invention is about 14 degrees (measured at the interior of the apex of the bend). Smaller angles may successfully be used in certain circumstances.

Another significant advantage of this invention is that the desiccant content of the coating layer can be high, although the benefits of this invention can still be obtained even if such high loadings are not utilized. Also, the coating layers can be thick enough to provide the heavy desiccant loading required to obtain effective dehumidification performance. Adsorbent desiccants have the advantages of not deliquescing and of chemical stability, but they can hold only a fraction of their own weight in water vapor at saturation. As a result, acceptable dehumidification performance requires a high desiccant loading while minimizing the non-desiccant mass in the adsorption body (i.e., the monolith). Thus, the desiccant content in the final dried or set coating layer may be at least 50% by weight, desirably at least 60% by weight, preferably at least 70% by weight, more preferably at least 75% by weight, and most preferably at least 85% by weight.

Another significant advantage of this invention is that the desiccant in the coating layer retains a high percentage of its original adsorption capacity. Another significant advantage is that the binder matrix is sufficiently breathable so that the material to be adsorbed can pass through the matrix at a sufficiently high rate so that the rate of adsorption by the coated substrate during operation is sufficiently high (i.e., the binder has "good breathability"). Typically the adsorption capacity of the desiccant in the coating layer will be at least 50%, desirably at least 60%, preferably at least 75%, more preferably at least 90%, and most preferably at least 95% of the original adsorption capacity of the desiccant per se. By "original capacity" is meant the normal or usual adsorptive capacity of the desiccant particles as obtained from the manufacturer, prior to their being utilized in the process of this invention.

Adsorption capacity may be determined in any of several ways. All methods involve placing a known sample weight of adsorbent in an environment of known conditions (e.g., temperature and humidity) and then allowing the sample to reach equilibrium. By comparing the initial and final weights of the sample, the amount of adsorbate picked up (adsorbed) by the adsorbent and, thus, adsorbent capacity may be readily determined. One of the well-known methods for quantifying moisture adsorption capacity is the McBain-Baker method. If the adsorbent is used to adsorb moisture while varying the humidity at constant temperature, an adsorption isotherm can be obtained. Adsorption capacities for adsorbates other than water may be determined in similar fashion.

The adsorption capacity of the final desiccant-coated substrate of this invention may be determined in a similar way and then compared to the capacity of the original dry desiccant per se (before manufacture of the coated substrate) to determine what percentage of the original capacity has been retained. For example, assume a desiccant-coated substrate of this invention picks up 1 gram of moisture when the sample is taken from one set of temperature and moisture conditions to another set of conditions and the sample contains 4 grams of dry desiccant. The capacity when operating between those two sets of conditions is thus 0.25 grams of water per gram of dry desiccant. If 4 grams of the same dry desiccant that was used to make the coated substrate also pick up 1 gram of moisture when operating between the same two sets of conditions, then the desiccant has retained 100% of its original capacity. Experiments have shown that the desiccant-coated substrates of this invention can retain more than 90% of the original capacity of the desiccant even when the coating thickness is greater than 4 mils per side.

Although the desiccant-coated substrates and devices of this invention find particular use in removing moisture, they may be used for recovering and/or removing substances other than moisture (for example, substances that may be valuable, substances that may be regarded as pollutants). Thus, as used in the claims, the word "desiccant" should be understood as referring to adsorbent materials of all degrees of affinity for water, i.e., adsorbent materials ranging from the most hydrophilic to the most hydrophobic even if those adsorbent materials are being used to remove substances other than water.

It should also be understood that although the desiccant-coated substrates of this invention can be used at temperatures in excess of 150 degrees Fahrenheit (about 66° C.), they need not be used at temperatures that high.

In summary, the invention provides desiccant-coated substrates, devices, and methods of making them that are cost-effective and have all of the numerous advantages described herein.

Variations and modifications will be apparent to those skilled in the art from this disclosure and the claims are intended to cover those variations and modifications that fall within the true spirit and scope of this invention.

We claim:

1. A process for making a device for gas treatment comprising a desiccant-coated substrate capable of being used at temperatures over 150 degrees Fahrenheit, the device having passageways for gas to flow through and contact the desiccant, the desiccant being in the form of particles and the particles having pores and being adhered to the substrate by a binder, the coated substrate being sufficiently flexible and the coating having sufficient adherence to the substrate so that the coated substrate can be formed into corrugated shapes, the desiccant particles in the coated substrate having at least 60% of their original adsorption capacity and the binder having good breathability; said process comprising the steps:

(a) forming an aqueous suspension comprising particles of one or more desiccants, a water-based organic binder, a suspending agent to help maintain the desiccant particles in suspension, and an organic pore-clearing agent at least some of which enters at least some of the pores of the desiccant particles;

(b) depositing the suspension on the substrate;

(c) causing the binder of the deposited suspension to set so that the deposited desiccant particles adhere to the substrate and causing at least some of the pore-clearing agent to leave the pores of the desiccant particles to prevent the binder from occluding at least some of the pores of the adhered desiccant particles, thereby to form a desiccant-coated substrate of sufficient flexibility and a coating having sufficient adherence to the substrate so that the desiccant-coated substrate can be formed into corrugated shapes and in which the desiccant particles in the coated substrate have at least 60% of their original adsorption capacity and the binder has good breathability; and (d) forming the desiccant-coated substrate into shapes having passageways for the flow of gas arranged so that gas flowing through the passageways comes into contact with the desiccant.

2. The process of claim 1 wherein the suspending agent is also the pore-clearing agent.

3. The process of claim 1 wherein the suspending agent is also the pore-clearing agent and is N-methyl-2-pyrrolidone.

4. The process of claim 1 wherein the binder is a polyurethane binder.

5. The process of claim 1 wherein the adhered desiccant coating on the substrate is at least 2 mils thick.

6. The process of claim 1 wherein the adhered desiccant coating on the substrate is at least 3 mils thick.

7. The process of claim 1 wherein the one or more desiccants are selected from the group consisting of molecular sieves and silica gels.

8. The process of claim 1 wherein the one or more desiccants comprise at least two desiccants.

9. The process of claim 1 wherein step (a) comprises forming an aqueous suspension comprising the particles of one or more desiccants, a suspending agent to help maintain the desiccant particles in suspension, and an organic pore-clearing agent at least some of which enters at least some of the pores of the desiccant particles and thereafter adding to the suspension a water-based organic binder.

10. The process of claim 1 wherein step (a) comprises forming an aqueous suspension comprising the particles of at least two desiccants; a suspending agent to help maintain the desiccant particles in suspension; a pH-adjusting agent to adjust the pH; and an organic pore-clearing agent at least some of which enters at least some of the pores of the desiccant particles; and thereafter adding to the suspension a water-based organic binder.

11. The process of claim 10 wherein the pH-adjusting agent is ammonium hydroxide.

12. The process of claim 1 wherein step (b) comprises using a double helically wound rod to deposit suspension on the substrate.

13. The process of claim 1 wherein step (c) comprises heating the suspension deposited on the substrate to cause the binder to set and to cause at least some of the pore-clearing agent to leave the pores of the desiccant particles to prevent the binder from occluding at least some of the pores of the adhered desiccant particles.

14. The process of claim 1 wherein the substrate has two major faces and steps (b) and (c) are carried out for each major face of the substrate, thereby adhering a desiccant coating to each face.

15. The process of claim 1 wherein step (c) comprises causing the pore-clearing agent to leave the pores of the desiccant particles to prevent the binder from occluding pores of the adhered desiccant particles so that the desiccant particles in the coated substrate have at least 75% of their original adsorption capacity.

16. The process of claim 1 wherein step (c) comprises causing the pore-clearing agent no leave the pores of the desiccant particles to prevent the binder from occluding pores of the adhered desiccant particles so that the desiccant particles in the coated substrate have at least 90% of their original adsorption capacity.

17. The process of claim 1 further comprising preloading the particles of desiccant with water before step (a) so that the water in the particles will be approximately in equilibrium with respect to water in the suspension.

18. The process of claim 1 wherein step (a) comprises forming an aqueous mixture of some of the particles of the one or more desiccants, thereafter adding the suspending agent and the organic pore-clearing agent, thereafter adding more of the particles of the one or more desiccants, and thereafter adding the water-based organic binder.

19. A device for gas treatment comprising a desiccant-coated substrate capable of being used at temperatures over 150 degrees Fahrenheit, the device having passageways for gas to flow through and contact the desiccant, the desiccant being in the form of particles and the particles having pores, the desiccant-coated substrate comprising a coating layer and a substrate, the coating layer being from about 2 mils to about 10 mils thick and comprising a water-based organic binder and at least 75% by weight desiccant, the coated substrate being sufficiently flexible and the coating layer having sufficient adherence to the substrate so that the coated substrate can be formed into corrugated shapes, the desiccant particles in the coated substrate having at least 75% of their original adsorption capacity and the binder having good breathability.

20. The device for gas treatment of claim 19 wherein the desiccant particles in the coated substrate have at least 90% of their original adsorption capacity.

21. The device for gas treatment of claim 20 wherein the desiccant comprises at least 85% by weight Of the coating layer.

22. The device for gas treatment of claim 19 wherein the coating layer is from about 3 mils to 8 mils thick.

23. The device for gas treatment of claim 22 wherein the desiccant comprises at least 85% by weight of the coating layer.

24. The device for gas treatment of claim 23 wherein the desiccant particles in the coated substrate have at least 90% of their original adsorption capacity.

25. The device for gas treatment of claim 19 wherein the binder is polyurethane.

26. The device for gas treatment of claim 25 wherein the desiccant comprises at least 85% by weight of the coating layer.

27. The device for gas treatment of claim 26 wherein the desiccant particles in the coated substrate have at least 90% of their original adsorption capacity.

28. The device for gas treatment of claim 19 wherein it is capable of being used at temperatures over 200 degrees Fahrenheit.

29. The device for gas treatment of claim 28 which is a dehumidification wheel.

30. The device for gas treatment of claim 19 which is a dehumidification wheel.

31. The device for gas treatment of claim 20 which is a dehumidification wheel.

32. The device for gas treatment of claim 19 in which the desiccant is hydrophobic.

33. The device for gas treatment of claim 19 in which the gas is air.

34. The process of claim 1 wherein the shapes formed in step (d) are corrugated shapes and they result from a corrugation process using corrugation gears having pressure angles of from about 7 to about 60 degrees.

35. The process of claim 1 wherein the shapes formed in step (d) are corrugated shapes and they have a bend angle measured at the interior of the apex of the bend of at least about 14 degrees.

36. The process of claim 1 wherein the shapes formed in step (d) are corrugated shapes and they have hydraulic diameters of at least 0.5 millimeters.

37. The device for gas treatment of claim 19 wherein the passageways are formed by corrugated shapes resulting from a corrugation process using corrugation gears having pressure angles of from about 7 to about 60 degrees.

38. The device for gas treatment of claim 19 wherein the passageways are formed by corrugated shapes having a bend angle measured at the interior of the apex of the bend of at least about 14 degrees.

39. The device for gas treatment of claim 19 wherein the passageways are formed by corrugated shapes having hydraulic diameters of at least 0.5 millimeters.

* * * * *